US011635636B2

(12) United States Patent
Drobe (10) Patent No.: US 11,635,636 B2
(45) Date of Patent: Apr. 25, 2023

(54) OPTICAL ARTICLE AND METHOD OF MANAGING OPTICAL POWERS THEREOF

(71) Applicant: Essilor International, Charenton-le-Pont (FR)

(72) Inventor: Bjorn Drobe, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 184 days.

(21) Appl. No.: 16/618,206

(22) PCT Filed: May 25, 2018

(86) PCT No.: PCT/EP2018/063836
§ 371 (c)(1),
(2) Date: Nov. 29, 2019

(87) PCT Pub. No.: WO2018/219828
PCT Pub. Date: Dec. 6, 2018

(65) Prior Publication Data
US 2020/0103677 A1  Apr. 2, 2020

(30) Foreign Application Priority Data
May 31, 2017  (EP) .................................... 17305637

(51) Int. Cl.
*G02C 7/02* (2006.01)
*G02C 7/08* (2006.01)

(52) U.S. Cl.
CPC ............. *G02C 7/083* (2013.01); *G02C 7/022* (2013.01); *G02C 7/027* (2013.01); *G02C 7/081* (2013.01); *G02C 2202/24* (2013.01)

(58) Field of Classification Search
CPC .... G02C 7/083; G02C 2202/24; G02C 7/022; G02C 7/027; G02C 7/06; G02C 7/061; G02C 7/081; G02C 7/085; G02C 7/101
(Continued)

(56) References Cited

U.S. PATENT DOCUMENTS 4,300,818 A    11/1981  Schachar
2001/0050754 A1  12/2001  Hay et al.
(Continued)

FOREIGN PATENT DOCUMENTS

JP    2004-157487 A    6/2004
JP    2015-52772 A     3/2015
(Continued)

OTHER PUBLICATIONS

International Search Report dated Jul. 5, 2018 in PCT/EP2018/063836 filed on May 25, 2018.

*Primary Examiner* — Robert E. Tallman
(74) *Attorney, Agent, or Firm* — Oblon, McClelland, Maier & Neustadt, L.L.P.

(57) ABSTRACT

An optical article may include a frame, a first active lens arrangement coupled to the frame, and a second active lens arrangement coupled to the frame. The first active lens arrangement and the second active lens arrangement may be lined up abreast with respect to each other. Further, the optical article may include a time-based optical power adjustment mechanism coupled to the first active lens arrangement and the second active lens arrangement. The time-based optical power adjustment mechanism may be configured to vary the optical power of the first active lens arrangement and the second active lens arrangement in accordance with a predetermined adjustment.

8 Claims, 3 Drawing Sheets

(58) Field of Classification Search
USPC .......................................... 351/159.39, 159.4
See application file for complete search history.

(56) References Cited

U.S. PATENT DOCUMENTS

| | | |
|---|---|---|
| 2006/0209431 A1 | 9/2006 | Spivey |
| 2011/0279772 A1* | 11/2011 | Blum ..................... G02C 7/022 |
| | | 351/159.39 |
| 2012/0194781 A1 | 8/2012 | Agurok |
| 2015/0185503 A1 | 7/2015 | Tate et al. |
| 2015/0219929 A1* | 8/2015 | Silver ....................... G02C 7/10 |
| | | 351/45 |
| 2015/0362751 A1 | 12/2015 | Biederman |
| 2016/0238858 A1* | 8/2016 | Chao ....................... G02C 5/146 |
| 2018/0143455 A1* | 5/2018 | Chin ........................... A61F 2/16 |
| 2020/0292848 A1* | 9/2020 | Yadin ..................... G02C 7/085 |
| 2021/0132418 A1* | 5/2021 | Muramatsu ........... G06F 3/0416 |

FOREIGN PATENT DOCUMENTS

| | | |
|---|---|---|
| WO | 2014/198027 A1 | 12/2014 |
| WO | WO 2015/191248 A1 | 12/2015 |
| WO | 2017/019771 A1 | 2/2017 |

\* cited by examiner

OPTICAL ARTICLE AND METHOD OF MANAGING OPTICAL POWERS THEREOF

TECHNICAL FIELD

Embodiments generally relate to an optical article, particularly to an optical article with active lens arrangement, and a method of managing optical powers thereof.

BACKGROUND

Effects of under-correction on myopic progression have been studied and investigated widely. However, as conventional glasses can only have fixed optical powers, these studies are typically restricted to investigating effects of a prolong and continuous fixed under-correction of the eyes of each test subject, whereby each test subject is usually provided with a single pair of fixed optical power glasses having binocular under-correction or a single pair of fixed optical power glasses having monocular under-correction for permanent wear over the duration of the studies. This is so as to minimise hassle for the test subjects, to avoid the test subjects from having to follow complicated switching glasses routine, and/or to avoid the test subjects deviating away from such complicated test routines. Without suitable optical article to minimise the hassle for the test subjects and/or to investigate effects of various under-correction routine or schedule, further progress in the study and search for an effective myopia control method is impeded.

SUMMARY

According to various embodiments, there is provided an optical article. The optical article may include a frame, a first active lens arrangement coupled to the frame, and a second active lens arrangement coupled to the frame. The first active lens arrangement and the second active lens arrangement may be lined up abreast with respect to each other. Further, the optical article may include a time-based optical power adjustment mechanism coupled to the first active lens arrangement and the second active lens arrangement. The time-based optical power adjustment mechanism may be configured to vary the optical power of the first active lens arrangement and the second active lens arrangement in accordance with a predetermined adjustment.

According to various embodiments, there is provided an optical system. The optical system may include an optical article according to various embodiments as described herein and an input device connected to the optical article. The input device may be configured for a user to provide the predetermined adjustment to the optical article such that the time-based optical power adjustment mechanism of the optical article may vary the optical power of the first active lens arrangement and the second active lens arrangement based on the predetermined adjustment.

According to various embodiments, there is provided a method of managing optical powers of a first active lens arrangement and a second active lens arrangement of an optical article configured to vary the optical power of the first active lens arrangement and the second active lens arrangement in accordance with a predetermined adjustment. The method may include alternately adjusting the optical power of the first active lens arrangement from a first preset optical power by a first predetermined adjustment optical power and the optical power of the second active lens arrangement from a second preset optical power by a second predetermined adjustment optical power.

BRIEF DESCRIPTION OF THE DRAWINGS

For a more complete understanding of the description provided herein and the advantages thereof, reference is now made to the brief descriptions below, taken in connection with the accompanying drawings and detailed description, wherein like reference numerals represent like parts. In the drawings, figures are not necessarily to scale, emphasis instead generally being placed upon illustrating the principles of the disclosure. In the following description, various embodiments are described with reference to the following drawings.

DETAILED DESCRIPTION

In the description, which follows the drawing, certain features may be shown in generalized or schematic form in the interest of clarity and conciseness or for informational purposes. In addition, although making and using various embodiments are discussed in detail below, it should be appreciated that as described herein are provided many inventive concepts that may be embodied in a wide variety of contexts. Embodiments discussed herein are merely representative and do not limit the scope of the disclosure.

Further, embodiments described below in context of the apparatus are analogously valid for the respective methods, and vice versa. Furthermore, it will be understood that the embodiments described below may be combined, for example, a part of one embodiment may be combined with a part of another embodiment.

It should be understood that the terms "on", "over", "top", "bottom", "down", "side", "back", "left", "right", "front", "lateral", "side", "up", "down" etc., when used in the following description are used for convenience and to aid understanding of relative positions or directions, and not intended to limit the orientation of any device, or structure or any part of any device or structure. In addition, the singular terms "a", "an", and "the" include plural references unless context clearly indicates otherwise. Similarly, the word "or" is intended to include "and" unless the context clearly indicates otherwise.

Various embodiments of an optical article have been provided to address at least some of the issues identified earlier.

Various embodiments of an optical article may be suitable for being used to investigate effects of various under-correction routine or schedule without being a hassle to the test subject. The various under-correction routine or schedule may include short-term monocular under-correction of each eye of the test subject. Various embodiments of the optical article may be programmable such that a predetermined under-correction routine or schedule may be pre-programmed into the optical article. Each test subject may then be issued with only one optical article, and the test subject may put on the optical article as per their normal daily routine without having to worry about following any complicated test routine or schedule. Accordingly, the optical article may provide the required under-correction based on the pre-programmed routine or schedule.

Accordingly, with an under-correction routine or schedule programmed into the optical article, various embodiments of the optical article may be used for myopia control, for example to slow and/or stop myopia progression when a suitable and effective under-correction routine or schedule is being programmed.

Various embodiments of an optical article may be configured to alternate the under-correction between two eyes following a specific temporal frequency. Accordingly, the optical article may be used to investigate effects of alternating under-correction on a temporal basis between two eyes based on a predetermined adjustment routine or schedule. In this manner, each test subject may only need to put on the optical article, and the optical article may take care of the alternating under-correction routine or schedule without requiring the test subject intervention.

Accordingly, with an alternating under-correction routine or schedule programmed into the optical article, various embodiments of the optical article may be used for myopia control, for example to slow and/or stop myopia progression when a suitable and effective alternating under-correction routine or schedule is being programmed.

Various embodiments have provided a method to manage optical powers of an optical article. The method may include alternately adjusting the optical powers of the left and right active lens arrangement of the optical article. Accordingly, various embodiments have provided a method to investigate effects of alternating under-correction between two eyes based on a predetermined adjustment routine or schedule. Consequently, by alternating monocular defocus between two eyes on a temporal basis, various embodiments have also provided a method of myopia control, for example to slow and/or stop myopia progression.

Figure 1:
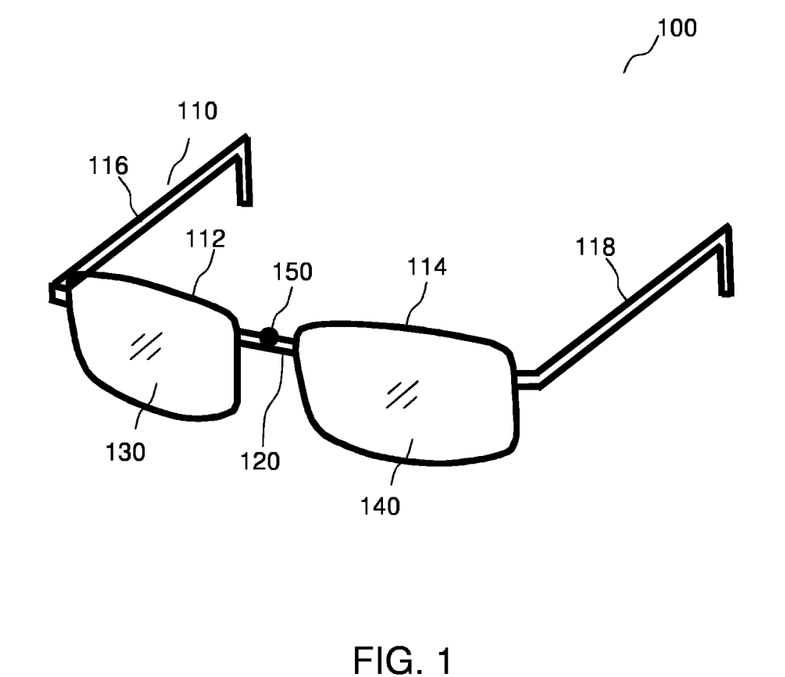
FIG. 1 depicts a schematic diagram of an optical article according to various embodiments.

FIG. 1 depicts an optical article 100 according to various embodiments. As shown, the optical article 100 may be an ophthalmic wear or eyewear, such as a pair of glasses or eyeglasses or spectacles or sunglasses or goggles or the like. The optical article 100 may include a frame 110. The optical article 100 may further include a first active lens arrangement 130 and a second active lens arrangement 140 coupled to the frame 110. The frame 110 may be a structure receiving, retaining, holding, and/or supporting the first active lens arrangement 130 and the second active lens arrangement 140 such that the first active lens arrangement 130 and the second active lens arrangement 140 may be aligned or lined up abreast with respect to each other so as to be placed in front of respective eyes of a wearer when the optical article 100 is being worn.

The frame 110 may include a rim (or eye-wire) 112, 114 for receiving, retaining, holding, and/or supporting each of the first and second active lens arrangement 130, 140. As shown, the frame 110 may include two rims 112, 114 in a side-by-side or alongside or abreast arrangement. Each of the two rims 112, 114 may be a full rim. According to various embodiments, the rim 112, 114 may also be a half rim, or the frame 110 may be without any rims. Accordingly, the frame 110 may be a full rimmed frame or a semi-rimless frame or a rimless frame.

The frame 110 may also include a bridge 120. The bridge 120 may be a part of the frame 110 which may be connected to the first active lens arrangement 130 and the second active lens arrangement 140. Accordingly, the bridge 120 may be between the first active lens arrangement 130 and the second active lens arrangement 140. Further, the bridge 120 may be above the nose of the wearer when the optical article 100 is being worn.

The frame 110 may also include a pair of temples 116, 118. The pair of temples 116, 118 may be the pair of elongated side pieces of the frame 110. Respective portions of each of the pair of temples 116, 118 may be rested or placed on the ear of the wearer when the optical article 100 is being worn. According to various embodiments, the pair of temples 116, 118 may be hinged temples or hinge-less temples.

According to various embodiments, active lens arrangement may refer to a lens or an assembly of lenses configured to provide variable or adjustable optical power. Accordingly, the active lens arrangement may be dynamic, in that a focal length of a portion of the active lens arrangement may be changed or varied or adjusted such that the optical power of the same portion of the active lens arrangement may be varied or adjusted. Accordingly, in contrast to bifocal or progressive lenses which have different optical powers fixed at different portions of the respective lens and which require the user to look through different portions of the respective lens to observe a change in the optical power, the active lens arrangement may allow the user to look through a single portion of the active lens arrangement, and vary or adjust the optical power of that portion of the active lens arrangement without requiring the user to change where the user is looking.

According to various embodiments, active lens arrangement may be based on electro-optical principle or opto-mechanical principle or any other suitable optical-related principles. Electro-optical principle may include applying electric potential to a liquid crystal medium or crystalline solids to change the refraction of the liquid crystal medium or the crystalline solids. Examples of active lens arrangement based on electro-optical principle may include electro-controlled fluidic lens, or electro-optic lens, or pixelated lens etc. Opto-mechanical principle may include moving of at least two lenses by sliding one over the other to change the combined focal length or adjusting liquid pressure against a diaphragm to control focus of a lens. Examples of active lens arrangement based on opto-mechanical principle may include Alvarez lens etc. Accordingly, each of the first active lens arrangement 130 and the second active lens arrangement 140 may include electro-controlled fluidic lens, or electro-optic lens, or Alvarez lens, or Fresnel lens, or pixelated lens, etc.

According to various embodiments, the optical article 100 may include single vision lenses or myopia control lenses, such as progressive addition lenses (PALs), bifocals, prismatic addition bifocals, peripheral correction lenses, etc. Accordingly, the single vision lenses or the myopia control lenses of the optical article 100 may include the first active lens arrangements 130 and/or the second active lens arrangement 140.

According to various embodiments, the optical article 100 may include a time-based optical power adjustment mechanism 150 coupled to the first active lens arrangement 130 and the second active lens arrangement 140. The time-based optical power adjustment mechanism 150 may be configured to vary the optical power of the first active lens arrangement 130 and/or the second active lens arrangement 140 in accordance with a predetermined adjustment. Accordingly, the time-based optical power adjustment mechanism 150 may be configured to interact with the first active lens arrangement 130 and/or the second active lens arrangement 140 so as to provide or apply a driving force or energy, depending on the operating principle of the active lens arrangement, to act upon, or drive, or direct, or stimulate, or actuate, or induce the first active lens arrangement 130 and/or the second active lens arrangement 140 to vary the respective optical power. The driving force or energy provided or applied by the time-based optical power adjustment mechanism 150 may be such that the optical power of the first active lens arrangement 130 and/or the second active lens arrangement 140 may be varied or adjusted based on a predetermined adjustment.

According to various embodiments, the time-based optical power adjustment mechanism 150 may be configured to increase and/or decrease the optical power of the first active lens arrangement 130 and/or the second active lens arrangement 140 in accordance with the predetermined adjustment.

As shown in FIG. 1, the time-based optical power adjustment mechanism 150 may be housed, contained, encased, or attached to the bridge 120 of the frame 110 of the optical article 100. According to various embodiments, the time-based optical power adjustment mechanism 150 may be housed, contained, encased, or attached to other parts of the frame 110 such as the rims 112, 114 or the temples 116, 118. According to various embodiments, the time-based optical power adjustment mechanism 150 may be configured such that it may be suitably dimensioned to fit within the frame 110 of the optical article 100.

According to various embodiments, the predetermined adjustment may include a sequence of and time allocated to vary the optical power of the first active lens arrangement 130 and the second active lens arrangement 140. The sequence of varying the optical power of the first active lens arrangement 130 and the second active lens arrangement 140 may include a series of events providing a particular order or a planned succession in which the first active lens arrangement 130 and/or the second active lens arrangement 140 may be acted upon, or driven, or directed, or stimulated, or actuated, or induced to vary the respective optical power. The sequence of varying the optical power of the first active lens arrangement 130 and the second active lens arrangement 140 may also include a specification of a predetermined amount of optical power adjustment at each discrete point of the order or the planned succession of varying the optical power.

Further, the time allocated to vary the optical power of the first active lens arrangement 130 and the second active lens arrangement 140 may refer to a time point for each event of the sequence of varying the optical power of the first active lens arrangement 130 and the second active lens arrangement 140. The time allocated to vary the optical power of the first active lens arrangement 130 and the second active lens arrangement 140 may also refer to a time period or a duration or a lapse of time in which the first active lens arrangement 130 and the second active lens arrangement 140 may maintain an optical power before the optical power is adjusted or varied.

Accordingly, the predetermined adjustment may be in the form of a predetermined adjustment plan, or a predetermined adjustment schedule, or a predetermined adjustment routine providing a list of events to specify, for example including but not limited to, when to vary the optical power, how long to maintain the adjusted optical power, which active lens arrangement to vary, by how much is the optical power varied, etc. Accordingly, the predetermined adjustment may include, but not limited to, a start time, an end time, a preset optical power, an adjustment optical power, a frequency of change, a duration of change, an order of change, or any combination thereof.

According to various embodiments, the sequence may include alternately varying the optical power of the first active lens arrangement 130 and the optical power of the second active lens arrangement 140. Accordingly, the optical power of the first active lens arrangement 130 and the optical power of the second active lens arrangement 140 may be varied one after the other repeatedly. For example, when the optical power of the first active lens arrangement 130 is being adjusted, the optical power of the second active lens arrangement 140 may be reverted back to the initial or original or normal optical power by removing any adjustment applied. Similarly, when the optical power of the second active lens arrangement 140 is being adjusted, the optical power of the first active lens arrangement 140 may be reverted back to the initial or original or normal optical power by removing any adjustment applied.

According to various other embodiments, various other sequences may be applicable. For example, another sequence may include, but not limited to, varying the optical power of the first active lens arrangement 130 by a first predetermined adjustment, followed by varying the optical power of the first active lens arrangement 130 by a second predetermined adjustment, followed by varying the optical power of the second active lens arrangement 140 by the first predetermined adjustment, and followed by varying the optical power of the second active lens arrangement 140 by the second predetermined adjustment. The first predetermined adjustment may be different from the second predetermined adjustment.

Figure 2:
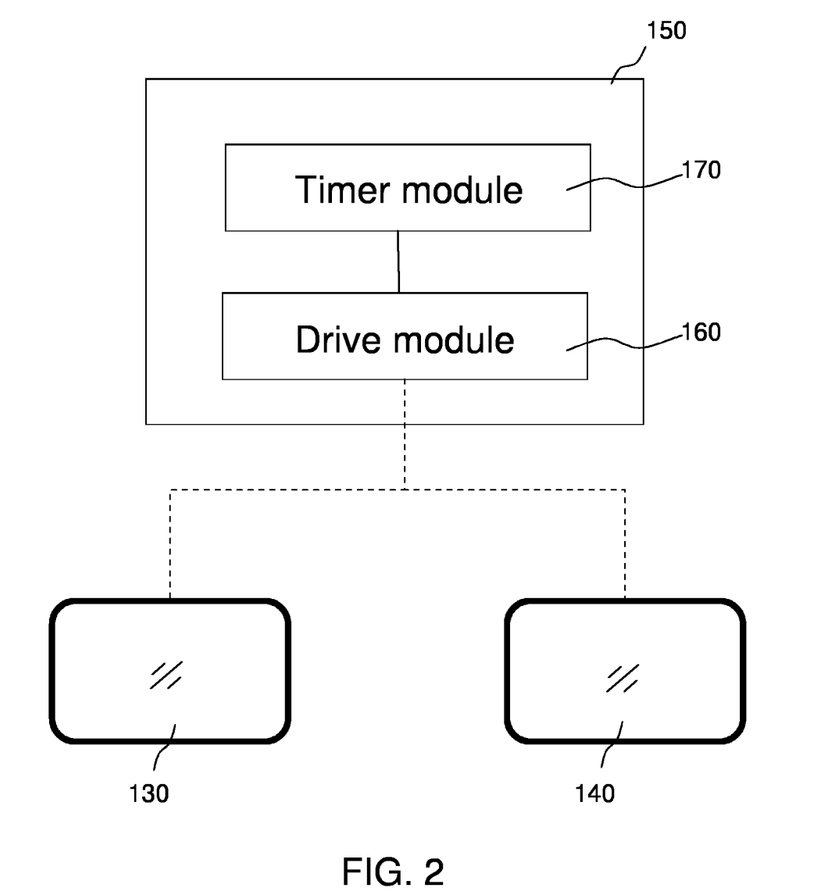
FIG. 2 depicts a schematic diagram of a time-based optical power adjustment mechanism of the optical article of FIG. 1 in connection with a first active lens arrangement and a second active lens arrangement of the optical article of FIG. 1 according to various embodiments.

FIG. 2 depicts a schematic diagram of the time-based optical power adjustment mechanism 150 in connection with the first active lens arrangement 130 and the second active lens arrangement 140 according to various embodiments. As shown, the time-based optical power adjustment mechanism 150 may include a drive module 160 and a timer module 170. The drive module 160 may be configured to interact with the first active lens arrangement 130 and the second active lens arrangement 140 for adjusting the optical power of the respective first and second active lens arrangement 130, 140. Accordingly, the drive module 160 may be configured to provide or apply the driving force or energy, depending on the operating principle of the active lens arrangement, to act upon, or drive, or direct, or stimulate, or actuate, or induce the first active lens arrangement 130 and/or the second active lens arrangement 140 to vary the respective optical power. Hence, the drive module 160 may be the component or the part of the time-based optical power adjustment mechanism that may interface with the first active lens arrangement 130 and the second active lens arrangement 140 to impart, or transmit, or apply the driving force or energy to the first active lens arrangement 130 and the second active lens arrangement 140 such that the first active lens arrangement 130 and the second active lens arrangement 140 may vary the respective optical power.

According to various embodiments, the timer module 170 may be coupled to the drive module 160. The timer module 170 may be configured to activate, or initiate, or prompt, or trigger the drive module 160 based on the predetermined adjustment. Accordingly, the timer module 170 may measure time and may be configured to send a signal to the drive module 160 after measuring a desired time interval or a desired elapsed time to activate the drive module 160 to adjust the optical power of the first active lens arrangement 130 and/or the second active lens arrangement 140. The desired time interval or the desired elapse time may be based on the time allocated for each event of the predetermined adjustment. The timer module 170 may measure time by counting upwards from zero, or counting downwards from a specified starting time interval. According to various embodiments, the timer module 170 may include a mechanical timer, an electromechanical timer, an electronic timer, or a software timer.

According to various embodiments, the first active lens arrangement 130 and the second active lens arrangement 140 may include an electro-active lens respectively. The electro-active lens may include an electro-active element which may have an adjustable refractive index such that the refractive index of the electro-active element may be adjusted by varying on a magnitude of a voltage, or a current, or an electric power applied to the electro-active element so as to vary the optical power of the electro-active lens. According to various embodiments, the electro-active element may include electro-active liquid crystal.

According to various embodiments, when the first active lens arrangement 130 and the second active lens arrangement 140 include the electro-active lens, the drive module 160 of the time-based optical power adjustment mechanism 150 may include a voltage generator configured to transmit a voltage to the electro-active lens, or a current generator configured to transmit a current to the electro-active lens, or an electric power generator configured to transmit an electric power to the electro-active lens. Accordingly, the drive module 160 may provide the appropriate driving force or energy to adjust the refractive index of the electro-active element of the electro-active lens so as to vary the optical power of the electro-active lens.

According to various embodiments, the first active lens arrangement 130 and the second active lens arrangement 140 may include a pair of lenses configured to glide or slide across one another. Each of the pair of lenses may include a wave-shaped surface. Further, relative translation between the pair of lenses via gliding or sliding may cause a combined optical power of the pair of lenses to vary. Accordingly, the drive module 160 of the time-based optical power adjustment mechanism 150 may include an actuation assembly configured to move the pair of lenses relative to each other. The actuation assembly may include a motor coupled to a rack and pinion mechanism, or a screw and roller mechanism, or a crank and slider mechanism so as to translate a rotation motion of the motor to a relative linear movement between the pair of lenses. In this manner, the drive module 160 may provide the appropriate driving force to cause a relative translation between the pair of lenses so as to vary the optical power of the active lens arrangement.

According to various embodiments, the time-based optical power adjustment mechanism 150 may include a connection port connectable to an input device for a user to input the predetermined adjustment. The connection port may include a physical port which may allow cables to be used to connect the time-based optical power adjustment mechanism 150 to the input device. The connection port may also include a wireless port which may allow wireless connection between the time-based optical power adjustment mechanism 150 and the input device. The input device may include a portable electronic device, or a mobile phone, or a laptop, or a computer, or a keyboard, or a touchpad, or any suitable input device which the user may use to provide inputs to the time-based optical power adjustment mechanism.

According to various embodiments, the time-based optical power adjustment mechanism may be configured to receive inputs including a set of parameters associated with wearer data to define the predetermined adjustment. The set of parameters may include, but not limited to, a start time, an end time, a preset optical power, an adjustment optical power, a frequency of change, a duration of change, an order of change, or any combination thereof. The wearer data may include age, prescription optical power (Rx), myopia progression, binocular vision, wearer's height, lifestyle (reading habits, time spent outdoors), lag of accommodation, stereopsis, etc. Accordingly, the optical article 100 may be customised based on the wearer.

According to various embodiments, the time-based optical power adjustment mechanism 150 may include a memory. The memory may be configured to store the inputs, i.e. the set of parameters defining the predetermined adjustment, received from the input device through the connection port. The memory may include a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

According to various embodiments, the timer module 170 and/or the drive module 160 may be configured to access the memory to retrieve or extract relevant information of the predetermined adjustment, such as relevant parameters, so as to vary the optical power of the first active lens arrangement 130 and the second active lens arrangement 140 accordingly.

According to various embodiments, the time-based optical power adjustment mechanism 150 may also include a controller. The controller may be understood as any kind of a logic implementing entity, which may be special purpose circuitry or a processor executing software stored in a memory, firmware, or any combination thereof. Thus, the controller may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). The controller may also be a processor executing software, e.g. any kind of computer program, e.g. a computer program using a virtual machine code such as e.g. Java. The controller may be configured to access the memory to retrieve or extract relevant information of the predetermined adjustment, process the information retrieved or extracted, and provide instructions to the timer module 170 and/or the drive module 160 based on the processed information such that the timer module 170 and the drive module 160 may be operated to vary the optical power of the first active lens arrangement 130 and the second active lens arrangement in accordance with the predetermined adjustment defined by the set of parameters stored in the memory.

According to various embodiments, the time-based optical power adjustment mechanism 150 may also include a power source. The power source may include a battery. The power source may be configured to supply power to the various components of the time-based optical power adjustment mechanism 150.

According to various embodiments, the optical article 100 in connection with the input device may form an optical system. Accordingly, the optical system may include the optical article 100 as described herein and an input device connected to the optical article 100. The input device may be configured for a user to provide the predetermined adjustment to the optical article 100 such that the time-based optical power adjustment mechanism 150 of the optical article 100 may vary the optical power of the first active lens arrangement 130 and the second active lens arrangement 140 based on the predetermined adjustment. The input device may be coupled to the optical article 100 via wired connection or wireless connection. The input device may include a portable electronic device, or a mobile phone, or a laptop, or a computer, or a keyboard, or a touchpad, or any suitable input device which the user may use to provide inputs to the time-based optical power adjustment mechanism 150.

According to various embodiments, there may be provided a method of managing optical powers of the first active lens arrangement 130 and the second active lens arrangement 140 of the optical article 100, which may be configured to vary the optical power of the first active lens arrangement 130 and the second active lens arrangement 140 in accordance with a predetermined adjustment. The method may include alternately adjusting the optical power of the first active lens arrangement 130 from a first preset optical power by a first predetermined adjustment optical power and the optical power of the second active lens arrangement 140 from a second preset optical power by a second predetermined adjustment optical power. The first and the second preset optical power may be the initial, or original, or equilibrium or normal optical power of the first active lens arrangement 130 and the second active lens arrangement 140 respectively. The first and the second predetermined adjustment optical power may be the desired amount or degree of optical power adjustment to be applied to the first active lens arrangement 130 and the second active lens arrangement 140 respectively.

According to various embodiments, the first preset optical power may be different from the second preset optical power. According to various other embodiments, the first preset optical power may be equal to the second preset optical power. According to various embodiments, the first predetermined adjustment optical power may be different from the second predetermined adjustment optical power. According to various other embodiments, the first predetermined adjustment optical power.

According to various embodiments, adjusting the optical power of the first active lens arrangement 130 and the optical power of the second active lens arrangement 140 may include increasing and/or decreasing the optical power of the first active lens arrangement 130 and the optical power of the second active lens arrangement 140.

According to various embodiments, the method may further include receiving a set of parameters associated with wearer data to define the predetermined adjustment to alternately adjust the optical power of the first active lens arrangement 130 and the optical power of the second active lens arrangement 140. The set of parameters may include, but not limited to, a start time, an end time, the first preset optical power, the second preset optical power, the first adjustment optical power, the second adjustment optical power, a frequency of change, a duration of change, an order of change, or any combination thereof. The wearer data may include age, prescription optical power (Rx), myopia progression, binocular vision, wearer's height, lifestyle (reading habits, time spent outdoors), lag of accommodation, stereopsis, etc. Accordingly, the method may be customised based on the wearer. For example, the first preset optical power of the first active lens arrangement 130 and the second preset optical power of the second active lens arrangement 140 may be based on the prescription optical power of the wearer. The first adjustment optical power of the first active lens arrangement 130 and the second adjustment optical power of the second active lens arrangement 140 may be based on the rate of myopia progression of the wearer.

According to various embodiments, when the optical power of the first active lens arrangement 130 is adjusted from the first preset optical power by the first predetermined adjustment optical power, the optical power of the second active lens arrangement may be reverted back to the second preset optical power. Similarly, when the optical power of the second active lens arrangement 140 is adjusted from the second preset optical power by the second predetermined adjustment optical power, the optical power of the first active lens arrangement may be reverted back to the first preset optical power.

According to various embodiments, each of the first predetermined adjustment optical power and the second predetermined adjustment optical power may be between 0.5 to 3.00 dioptre.

According to various embodiments, each of the optical power of the first active lens arrangement and the optical power of the second active lens arrangement may be adjusted at a frequency of between once per 5 minutes to once per 24 hours.

According to various embodiments, the method of managing optical powers may be applied to optical article having either single vision lenses or myopia control lenses, such as progressive addition lenses (PALs), bifocals, prismatic addition bifocals, peripheral correction lenses, etc.

Figure 3:
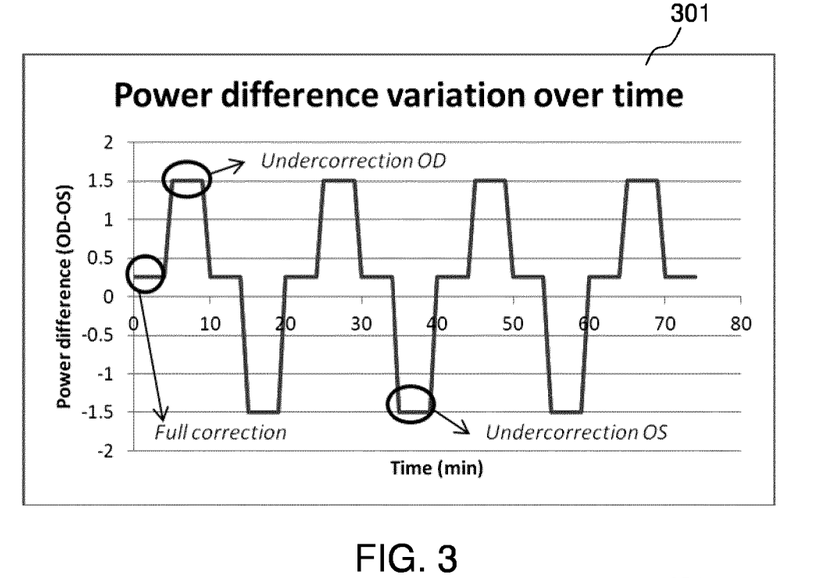
FIG. 3 depicts a graph illustrating the optical power difference between the first active lens arrangement (or the right lens, OD) and the second active lens arrangement (or the left lens, OS) according to an example implementation.
Figure 4:
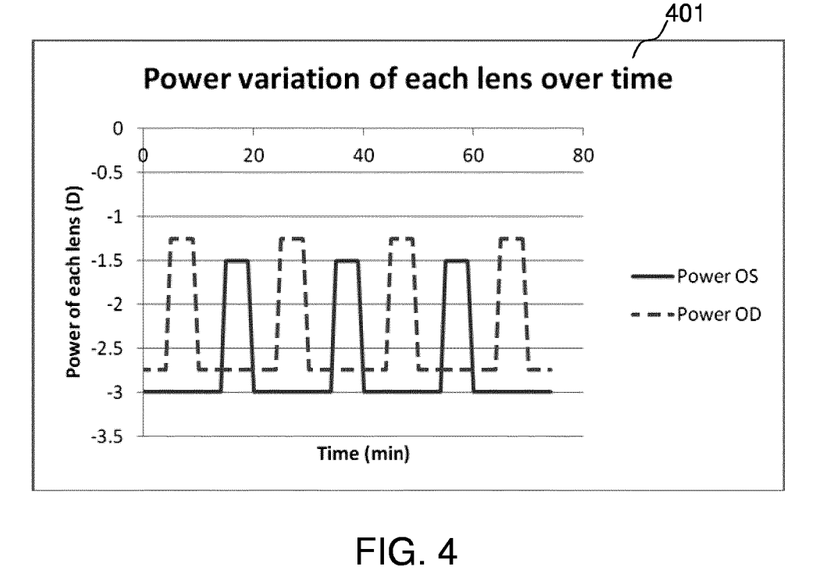
FIG. 4 depicts a graph illustrating the power variation of each of the first active lens arrangement (or the right lens, OD) and the second active lens arrangement (or the left lens, OS) according to an example implementation.

An example of an implementation of the method of managing optical powers of the first active lens arrangement 130 and the second active lens arrangement 140 of the optical article 100 is described below with reference to FIG. 3 and FIG. 4. FIG. 3 depicts a graph 301 illustrating the optical power difference between the first active lens arrangement 130 (or the right lens, OD) and the second active lens arrangement 140 (or the left lens, OS). FIG. 4 depicts a graph 401 illustrating the power variation of each of the first active lens arrangement 130 (or the right lens, OD) and the second active lens arrangement 140 (or the left lens, OS).

In the example, the wearer may have a prescription correction optical power of OD: −2.75 dioptre and OS: −3.00 dioptre. In the normal state of the optical article 100, the first active lens arrangement 130 and the second active lens arrangement 140 may not be adjusted or may not be activated for adjustment, and may have the respective first preset optical power and second preset optical power. The first preset optical power of the first active lens arrangement 130 may be −2.75 dioptre and the second preset optical power of the second active lens arrangement 140 may be −3.00 dioptre. Hence, in the normal state, the respective optical power of the respective first active lens arrangement 130 and second active lens arrangement 140 may be equal to the ametropia of the wearer.

When the optical article 100 is activated, for example via a switch on the frame 110 of the optical article 100, the method of managing optical powers of the first active lens arrangement 130 and the second active lens arrangement 140 of the optical article 100 may be activated. Accordingly, the optical power of the first active lens arrangement 130 and the optical power of the second active lens arrangement 140 may be alternately adjusted from the first preset optical power by a first predetermined adjustment optical power and the second preset optical power by a second predetermined adjustment optical power respectively. The first predetermined adjustment optical power and the second predetermined adjustment optical power may be 1.5 dioptre.

As shown in FIG. 3 and FIG. 4, the predetermined adjustment may include a temporal cycle wherein the optical power of the respective first active lens arrangement 130 and second active lens arrangement 140 is changed every five minutes between under-correction of 1.5 dioptre OD, full correction, and under-correction of 1.5 dioptre OS.

It is understood that the example above with reference to FIG. 3 and FIG. 4 is provided for illustration only. Various embodiments are not limited to the example as shown. Accordingly, various embodiments of the method may include longer time interval, for example one hour instead of five minutes. Various embodiments of the method may also not include a time period of full correction.

According to various embodiments, other than using the optical article 100 to study or investigate the effect of various under-correction routine or schedule on test subjects, the optical article 100 may also be used to slow and/or stop myopia progression when a suitable and effective under-correction routine or schedule is being programmed into the optical article 100. Accordingly, various embodiments may also provide a method of myopia control. The myopia control method may include providing a user with the optical article 100 having the first active lens arrangement 130, the second active lens arrangement 140, and the time-based optical power adjustment mechanism 150 configured to vary the optical power of the first active lens arrangement 130 and the second active lens arrangement 140. The method may further include applying monocular under-correction alternately between the right eye and the left eye of the user following a specific temporal frequency or a prescribed time interval using the optical article 100. Accordingly, the method seeks to induce monocular under-correction (or myopic defocus) to slow myopia progression of the user.

According to various embodiments, said applying monocular under-correction alternately between the right eye and the left eye using the optical article 100 may include alternately adjusting respective optical power of the first active lens arrangement 130 and the second active lens arrangement 140 for under-correction to switch monocular defocus alternately between the right eye and the left eye of the user.

According to various embodiments, the amount of under-correction may be between 0.5 dioptre to 3.00 dioptre, or be between 1.25 dioptre and 1.75 dioptre. According to various embodiments, each of the right eye and the left eye may be under-corrected for a time period or duration of less or equal to one day (or 24 hours), or between 5 minutes and 1 hour (or 60 minutes). According to various embodiments, the method may include a state of full correction (or no under-correction) on both eyes in between the under-correction alternation. According to various embodiments, the amount of under-correction may be different on each eye. For example, less defocus for the less myopic eye. Accordingly, the method according to various embodiments may also address an existing anisometropia of the user. According to various embodiments, the lenses of the optical article may be either single vision lenses or myopia control lenses, such as progressive addition lenses (PALs), bifocals, prismatic addition bifocals, peripheral correction lenses, etc.

While the disclosure has been particularly shown and described with reference to specific embodiments, it should be understood by those skilled in the art that various changes, modification, variation in form and detail may be made therein without departing from the scope of the disclosure as defined by the appended claims. The scope of the disclosure is thus indicated by the appended claims and all changes which come within the meaning and range of equivalency of the claims are therefore intended to be embraced.

The invention claimed is:

1. An optical article comprising:
   a frame;
   a first active lens arrangement coupled to the frame;
   a second active lens arrangement coupled to the frame, wherein the first active lens arrangement and the second active lens arrangement are lined up abreast with respect to each other; and
   a time-based optical power adjustment mechanism coupled to the first active lens arrangement and the second active lens arrangement, wherein the time-based optical power adjustment mechanism is configured to vary the optical power of the first active lens arrangement and the second active lens arrangement in accordance with a predetermined adjustment,
   wherein the predetermined adjustment comprises a sequence and a time allocated to vary the optical power of the first active lens arrangement and the second active lens arrangement, and
   wherein the time-based optical power adjustment mechanism further comprises:
   a drive module configured to interact with the first active lens arrangement and the second active lens arrangement for activating and adjusting the optical power of the respective active lens arrangement; and
   a timer module coupled to the drive module, the timer module being configured to measure time and to activate the drive module based on measured time to initiate optical power, and then to adjust the optical power based on measured time and the pre-determined adjustment.

2. The optical article as claimed in claim 1, wherein the sequence comprises alternately varying the optical power of the first active lens arrangement and the optical power of the second active lens arrangement.

3. The optical article as claimed in claim 1, wherein at least one of the first active lens arrangement and the second active lens arrangement comprises an electro-active lens or a pair of lenses configured to glide across one another.

4. The optical article as claimed in claim 3, wherein, when at least one of the first active lens arrangement and the second active lens arrangement comprises the electro-active lens, the drive module of the time-based optical power adjustment mechanism comprises a voltage generator configured to transmit a voltage to the electro-active lens.

5. The optical article as claimed in claim 3, wherein, when at least one of the first active lens arrangement and the second active lens arrangement comprises a pair of lenses configured to glide across one another, the drive module of the time-based optical power adjustment mechanism comprises an actuation assembly configured to move the pair of lenses relative to each other.

6. The optical article as claimed in claim 1, wherein the time-based optical power adjustment mechanism further comprises a connection port connectable to an input device for a user to input the predetermined adjustment.

7. The optical article as claimed in claim 1, wherein the time-based optical power adjustment mechanism is configured to receive at least one input comprising one or more parameters associated with wearer data to define the predetermined adjustment, wherein the one or more parameters comprises a start time, an end time, a preset optical power, an adjustment optical power, a frequency of change, a duration of change, an order of change, or any combination thereof.

8. An optical system comprising:
   an optical article according to claim 1; and
   an input device connected to the optical article, wherein the input device is configured for a user to provide the predetermined adjustment to the optical article such that the time-based optical power adjustment mechanism of the optical article varies the optical power of the first active lens arrangement and the second active lens arrangement based on the predetermined adjustment.

* * * * *